A. H. BORGSTRÖM.
APPARATUS FOR THE CONTINUOUS MANUFACTURE OF BUTTER.
APPLICATION FILED MAR. 2, 1908.
938,815.
Patented Nov. 2, 1909.
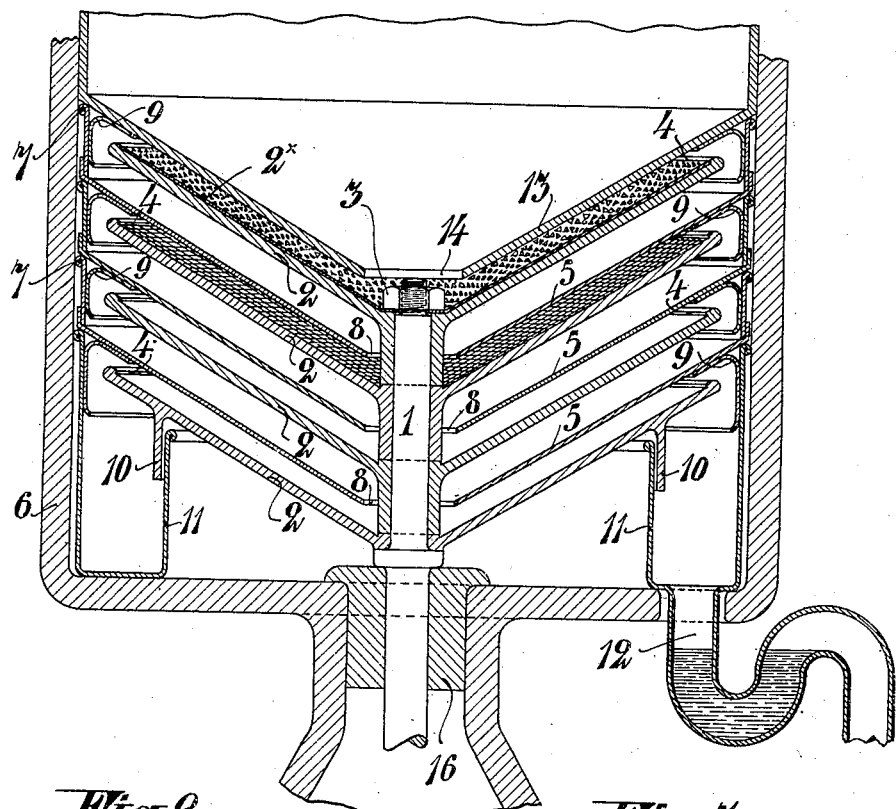
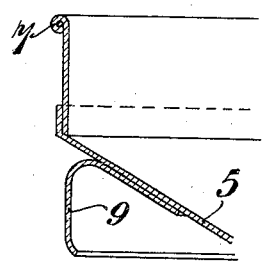
Witnesses:
Inventor
Arthur Hjalmar Borgström
by attorneys

UNITED STATES PATENT OFFICE.

ARTHUR HJALMAR BORGSTRÖM, OF HANGÖ, RUSSIA.

APPARATUS FOR THE CONTINUOUS MANUFACTURE OF BUTTER.

938,815.  Specification of Letters Patent.  Patented Nov. 2, 1909.

Application filed March 2, 1908. Serial No. 418,662.

*To all whom it may concern:*

Be it known that I, ARTHUR HJALMAR BORGSTRÖM, a subject of the Grand Duke of Finland, and resident of Hangö, in the Grand Duchy of Finland, Russia, have invented certain new and useful Improvements in Apparatus for the Continuous Manufacture of Butter, of which the following is a specification, reference being had therein to the accompanying drawing.

The fact that in the continuous manufacture of butter no results have hitherto been reached equally satisfactory as the results gained in the continuous separating of cream from the full milk is due partly to insufficient effectiveness of the methods used partly to too great a complicacy of the apparatus and difficulty of managing the same.

This invention relates to apparatus for the continuous manufacture of butter, which is very simple and insures very good results. Also in this case the centrifugal force is used, not for effecting a separating operation, however, but only for the effecting of a very intensive working of the cream. The said working is effected by the cream being caused to pass in a thin layer over a rotating surface so arranged that there is a great friction between the same and the cream. Owing to the said fact the cream layer is worked through immediately, and only a sufficient extent and velocity of the surface are necessary for rendering the working sufficient. For the daily work in dairies, however, an apparatus with only one rotating surface with sufficient extent and velocity would be unpractical. For this reason the object is gained in a more suitable way by providing the apparatus with a plurality of surface elements, arranged one behind the other. Through the said arrangement the greatest possible effect is gained by the smallest possible consumption of power.

In the accompanying drawing Figure 1 is a section of one form of the apparatus, provided with conical disks, Figs. 2 and 3 are details.

A number of funnel like disks 2, 2 are threaded on a vertical shaft 1, which disks are held at a certain distance from each other by their hubs, elongated for the purpose, or by interposed pieces, threaded on the said shaft, or in any other suitable manner. The said disks are jammed by means of a nut 3, so that they partake in the rotary motion of the shaft, rotated with great speed. The top side of the disks is provided with narrow grooves crossing each other like a file or rasp or on the said side a plate or the like may be mounted, arranged in the said manner. If a separate plate is used, it may be finely perforated, the holes being effected from below by means of a polygonal, preferably three-edged, stamp, so that the top side is like a grater. The uppermost disk, Fig. 1, is provided with such a plate.

Fig. 2 shows a part of the plate in full size.

The plates are held at the shaft between the disks 2, so that they partake in the rotary motion of the same, but their other part may rest freely on disks, inclosed by their outer edge 4 bent upward, so that the disks and the plates can easily be separated, when they are to be cleaned or the plates are to be changed for new ones or for plates with narrower or wider holes and so on. Between the disks 2, 2 stationary disks 5, 5 are located, one in each space, which have the same conicity as the disks 2, 2 and are mounted upon each other in the upper part of the frame 6, shaped like a vessel, and are supported by collars 7, provided at the outer edge of the disks. Every disk 5 is provided at its center with an opening 8, which is wider than the hub of the disk 2. A shield 9 curve shaped in section, is fixed to the under side of the disk 5 and fits tightly to the inside of the collar of the next, subjacent disk 5, thus forming a tight joint between the disks. Fig. 3 shows a section of the outer part of a disk 5. On the lower side of the lowermost disk 2 a collar 10 is provided, which extends downward into a ring shaped vessel 11, mounted on the bottom of the frame and provided with an outlet pipe 12. The vessel 13, containing the cream, is mounted on the top of the frame, the said vessel being provided in the bottom with an opening 14 and an automatically operating valve (not shown in the drawing) of the well known construction.

The cream passing to the uppermost disk is immediately caused to rotate owing to the roughness of the disk but is acted upon by the centrifugal force in the same degree and, consequently, is forced outward on the disk. The peripheral velocity of the disk, however, increases toward the periphery of the disk and the said velocity can not be imparted to the cream owing to the inertia of the same. Owing to the said fact and the file- or grater-like condition of the surface and the rushing of the cream outward, there is a great friction between the cream layer, decreasing in thickness toward the periphery of the disk, and the disk, so that the cream is worked through intensively. The thickness of the cream layer is controlled by controlling the passage of the cream into the apparatus from the vessel 13. The worked mass is thrown from the periphery of the disk against the shield 9, whereupon the mass returns on the smooth plate 5 to the center and falls down on the next disk and so on. The mass falls down from the lowermost disk 2 into the ring shaped vessel 11 and leaves the apparatus through the outlet pipe 12. The collar 10 and the vessel 11 prevent the mass from passing to the bearing 16 of the shaft. In order to prevent the atmospheric air from passing to the inner parts and increasing the temperature of the cooled cream, the bearing 16 may be made air-tight and the outlet pipe provided with a valve, or the like, so that also at the said pipe air is prevented from passing to the disks. For facilitating the taking up of the stationary plates from the apparatus, they are provided with hooks or the like on suitable places.

The number of the disks may be greater or less according to their size and velocity and the nature of the material to be treated. The rotating disks and also the stationary plates may be plane, but the conical shape of the latter will, evidently, facilitate the returning of the material toward the center of the plates.

The passing of the material through the apparatus is accelerated also by the sucking action from the center of the apparatus outward effected by the rotating disks 2, which sucking action is effective also with relation to the passing of the material from the vessel 13, through the bottom opening 14.

For the explaining of the mode of action of the apparatus it may further be stated, that the apparatus in the forms described above is adapted principally for the applying of the method of treating cream of a temperature, which does not permit the formation of butter, i. e. a temperature below about 9° Cent., described in the U. S. Letters Patent No. 870,217. First after the passing of the material through the apparatus it is heated to the ordinary churning temperature the butter being then separated from the churn-milk, by means of or without a stirring operation.

Having now described my invention, what I claim as new and desire to secure by Letters Patent is:

1. In the art of butter making, a rotary cone-shaped disk provided with a rasp-like roughened surface mounted with its concave side uppermost, in combination with means for rotating the disk, a stationary retaining wall located above and near the surface of the disk leaving a narrow space between the roughened surface of the rotary disk and stationary wall, the said upper wall being provided with an opening through which milk or cream may be admitted to the space between the two, and means for maintaining a body of cream or milk in position to flow continuously through said opening, whereby the body of cream or milk passing continuously between the two walls may be comminuted by a tearing, abrading or grinding action of the rotary disk.

2. In the art of butter making, a plurality of cone-shaped disks mounted one above another to rotate, the said disks having a rasp-like roughened surface, stationary disks located one above and near the face of each rotary disk, the said stationary disks having openings at their lower extremities for permitting the flow of milk or cream to the rotary disk next below, an outer wall or casing surrounding and spaced from the outer extremities of the said rotary disks for permitting the flow of milk or cream over the outer edges of the rotary disk on to stationary disks below them and a vessel provided with an outlet for receiving the milk or cream from the lowermost rotary disk, whereby a plurality of disk-like bodies of milk or cream may be maintained one above another, and submitted to the tearing or abrading action of the roughened surfaces of the rotary disks.

In witness whereof, I have hereunto signed my name in the presence of two subscribing witnesses.

ARTHUR HJALMAR BORGSTRÖM.

Witnesses:
HJALMAR ZETTERSTRÖM,
ROBERT APELGREN.